July 25, 1933.  H. KEIZER  1,919,469
WAFFLE EXTRACTOR
Original Filed June 25, 1931
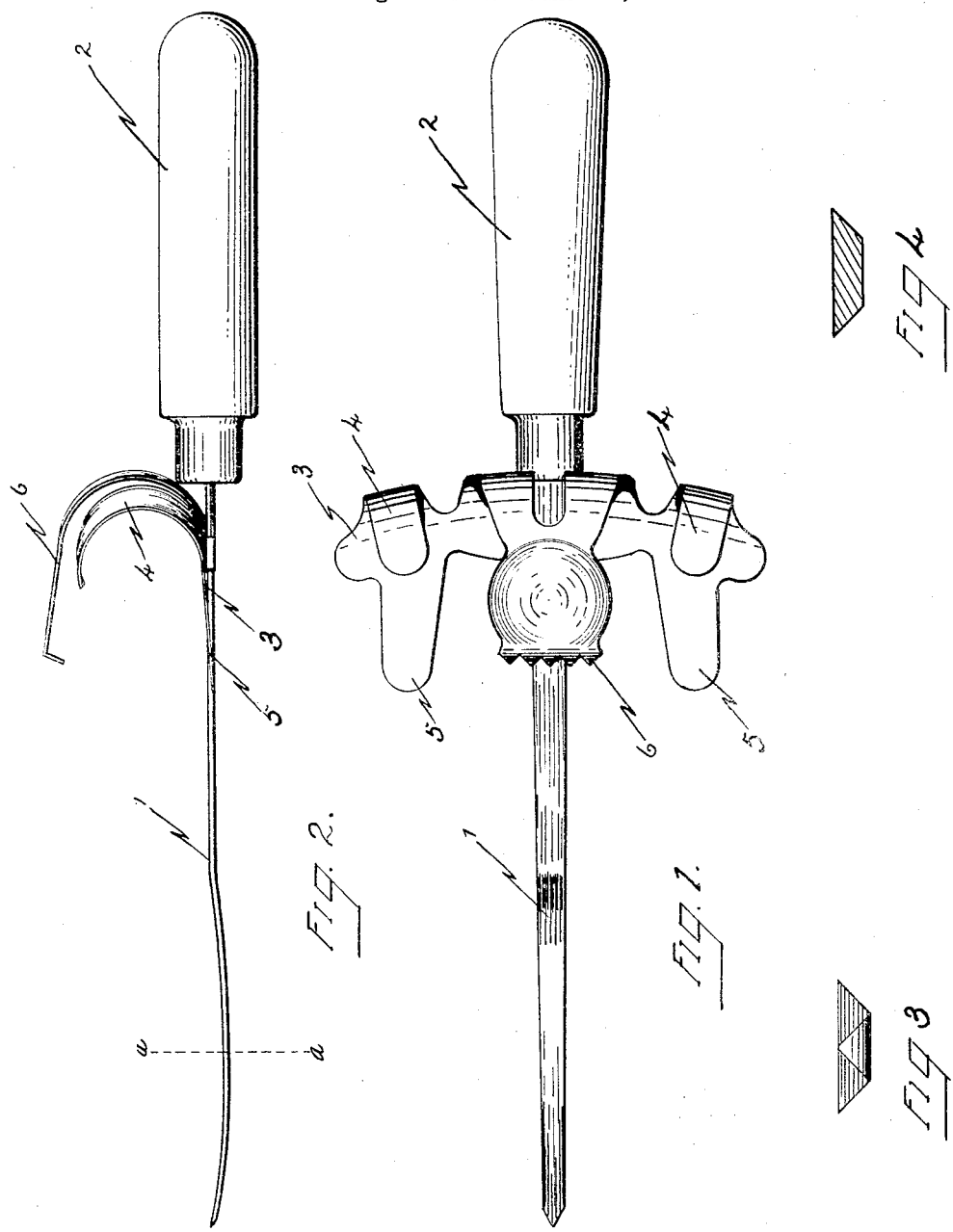
Harold Keizer INVENTOR.
BY
ATTORNEY.

Patented July 25, 1933

1,919,469

UNITED STATES PATENT OFFICE

HAROLD KEIZER, OF CONCORD, MASSACHUSETTS

WAFFLE EXTRACTOR

Application filed June 25, 1931, Serial No. 546,801. Renewed December 28, 1932.

This invention relates to an improved instrument, to be known as a waffle extractor, for extracting waffles from iron. Said waffle extractor comprising a handle, a blade of particular design, a cross member attached to said blade and adjacent to said handle, said member provided with projections. Two of said projections extending outward and parallel to the blade so as to provide cross member with an added means of supporting waffle, the other two projections extending upward to form stop, and a resilient thumb-press positioned above cross member. The object of this invention is to provide an instrument for liberating waffles which adhere to waffle iron; and second to provide means of holding waffle on said instrument so that waffle may be lifted and carried without being touched by the human hand.

This invention is illustrated in accompanying drawing in which Fig. 1 is a plan view of the article showing the relative position of the stops, supports, and resilient thumb-press. Fig. 2 is a side view showing position of stops and resilient thumb-press above blade. Fig. 3 is a view of point and Fig. 4, a cross sectional view of blade at $a, a$, Fig. 2. The portion 3, supports 5, stops 4, and resilient thumb-press 6, constitute the cross member, which is attached to blade 1.

The blade 1 is designed to fit in grooves of waffle iron so that it can be slipped below waffle while waffle is in said iron, the purpose is to liberate waffle from iron at any point of adhesion particularly the center point where waffle adheres most strongly.

As blade 1, slipped under waffle reaches center of waffle iron, the supports 5, will pass under outer edge of waffle and support said waffle on said blade, the resilient thumb-press 6 will now be in position above outer edge of waffle so that when said thumb-press is pressed downward the waffle will be held by blade 1, supports 5, on the underside, and thumb-press 6, on upper side. In this manner waffle may be carried and placed in any desired position. The blade 1 having a double edge shown enlarged in cross sectional view 4, is tapered toward the point, a depression in blade towards the point will permit the point to rest level on bottom of waffle iron groove when the upper portion of blade is held at an angle to said groove, the shape of blade is shown in 1, Fig. 2.

Having thus described my invention, what I claim as new and desired to be secured and protected by Letters Patent is:

1. A waffle extractor comprising a handle, a blade tapered towards the point, said point slightly upturned, a cross member attached to said blade adjacent said handle, said member provided with projections forming stops and projections forming supports, a resilient thumb-press positioned above said member, said thumb-press having downwardly pointed notches or teeth at its outer extremity.

2. A waffle extractor comprising a handle, a blade, a cross member attached to said blade adjacent said handle, a resilient thumb-press above said cross member, and in position to form a holding device in conjunction with said cross member.

3. A waffle extractor comprising a handle, a blade, a cross member attached to said blade adjacent said handle, said member being provided with projections forming stops and supports and a resilient thumb-press, positioned above said member.

HAROLD KEIZER.